Figure 1:
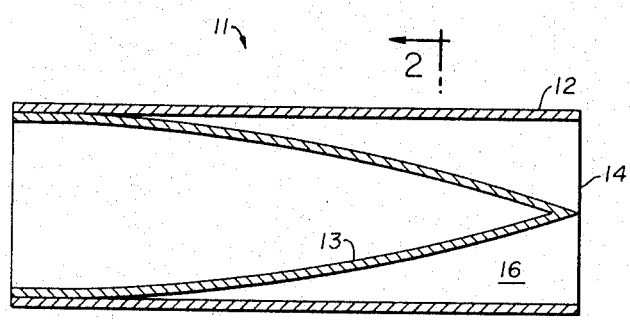

Dec. 19, 1967   Q. A. KERNS   3,359,452
RESONATOR FOR SUPPORTING NON-SINUSOIDAL PERIODIC WAVEFORMS
Filed Oct. 14, 1965   2 Sheets-Sheet 1

INVENTOR.
QUENTIN A. KERNS
BY
Roland A. Anderson
ATTORNEY.

Dec. 19, 1967  Q. A. KERNS  3,359,452
RESONATOR FOR SUPPORTING NON-SINUSOIDAL PERIODIC WAVEFORMS
Filed Oct. 14, 1965  2 Sheets-Sheet 2

INVENTOR.
QUENTIN A. KERNS
BY
Roland A. Anderson
ATTORNEY.

United States Patent Office 3,359,452
Patented Dec. 19, 1967

3,359,452
RESONATOR FOR SUPPORTING NON-SINUS-OIDAL PERIODIC WAVEFORMS
Quentin A. Kerns, Orinda, Calif., assignor to the United States of America as represented by the United States Atomic Energy Commission
Filed Oct. 14, 1965, Ser. No. 496,197
10 Claims. (Cl. 315—5.52)

This invention relates generally to high frequency electrical apparatus and more particularly to a class of high frequency resonators capable of supporting non-sinusoidal electrical oscillations.

While the invention is applicable to a variety of different types of resonators, it will herein be initially described with reference to cavity resonators in particular in order to best illustrate the principles involved. A cavity resonator is generally defined as an enclosed region in which electromagnetic energy may be stored and having resonances at frequencies determined by the geometry of the electrically conductive walls. Cavity resonators generally have many resonance frequencies, the frequencies at which the resonances occur in a particular cavity being individually determined by the dimensions and shape of the cavity. There is usually no inherent harmonic relationship between the various resonance frequencies of a cavity resonator, that is, the higher order resonance frequencies are not harmonics of the lowest resonance frequency. Therefore, if a cavity resonator is excited at a resonance frequency by a non-sinusoidal periodic input signal, the energy is stored as a sinusoidal wave since there are no harmonic resonance frequencies to support a non-sinusoidal signal.

An electrical signal having a non-sinusoidal periodic waveform is describable as a Fourier series, $$f(x) = \sum_{n=1}^{\infty} (A_n \cos nx + B_n \sin nx)$$

which shows that the signal can be described as a plurality of harmonically related sine wave signals. Therefore, a non-sinusoidal periodic signal can only be supported in a cavity resonator in which resonance occurs at integer multiples of the fundamental frequency.

The present invention provides a cavity resonator supporting the integer multiples of a fundamental frequency. The invention is not limited to standing wave resonators but can be applied to traveling wave cavities by incorporating a suitable circulator between input and output ports (i.e. terminals).

Such a device is particularly useful in connection with high energy charged particle accelerators and detectors. The invention can be operated continuously to provide specialized waveforms for charged particle beam acceleration, separation, or extraction, the invention being for instance, in the form of a klystron type of waveform buncher or as a cavity providing specialized waveforms. However, if desired, pulsed output power can be provided by accumulating a large amount of energy in a cavity over a long period of time for later rapid discharge to provide fast rising, shaped pulses of high peak power. Such pulses are used, for instance, in spark chambers for detecting high energy charged particles.

The invention may also be used as a function generator. The various standing waves in the cavity add together in differing ratios at various points within a cavity, so that by suitable placement of output devices, an output signal having a waveform differing from the waveform of the input signal is obtainable.

It is therefore an object of this invention to provide high frequency electrical resonators capable of resonating with non-sinusoidal waveshapes.

It is another object of the invention to provide a resonator with an output signal having a selected waveshape.

It is another object of the present invention to provide a high frequency resonator which has resonance frequencies which are integer multiples of a fundamental frequency.

It is another object of the present invention to provide a resonator which may be used as a function generator.

It is another object of the present invention to provide a cavity resonator, for use in conjunction with a particle accelerator, which can directly accelerate, separate, or extract a beam of high energy charged particles.

It is another object of the present invention to provide a cavity resonator for storing energy for producing a shaped pulse or a pulse train of high intensity.

Figure 2:
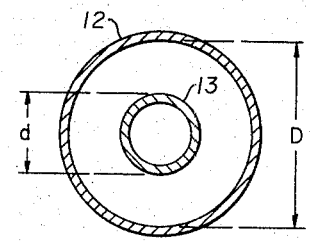
Figure 4:
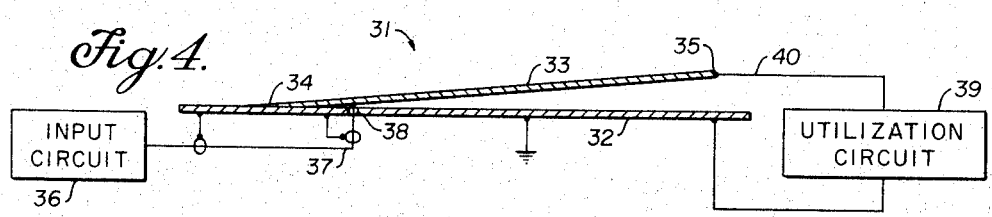
Figure 3:
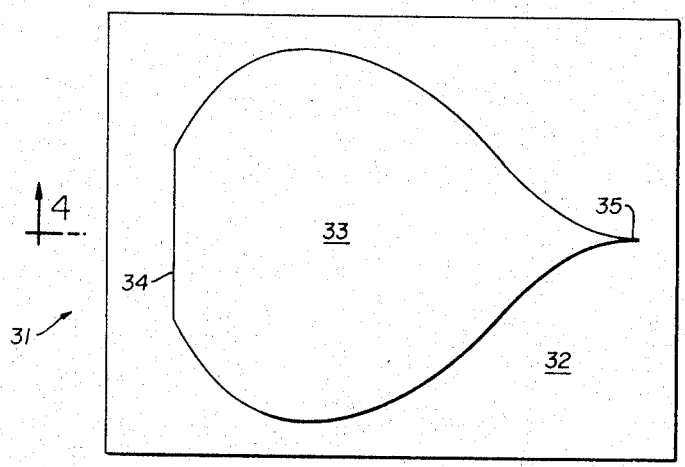
Figure 5:
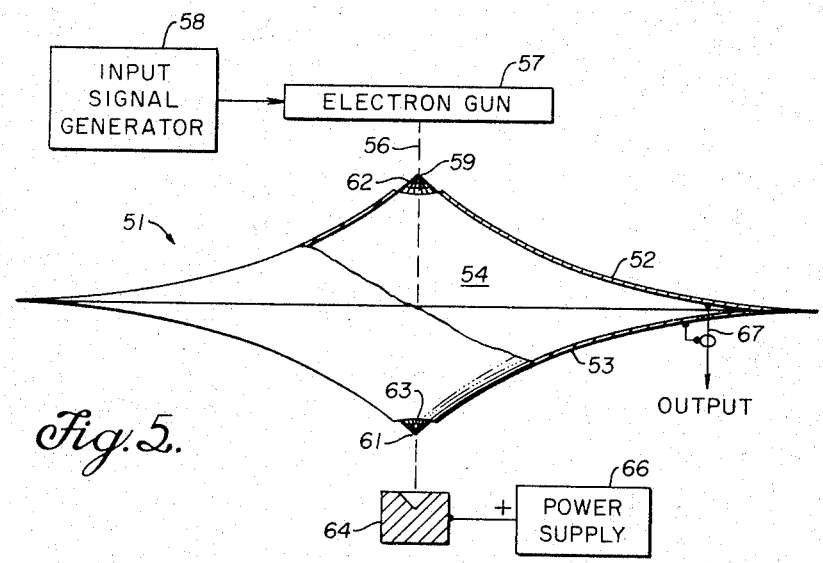
Figure 6:
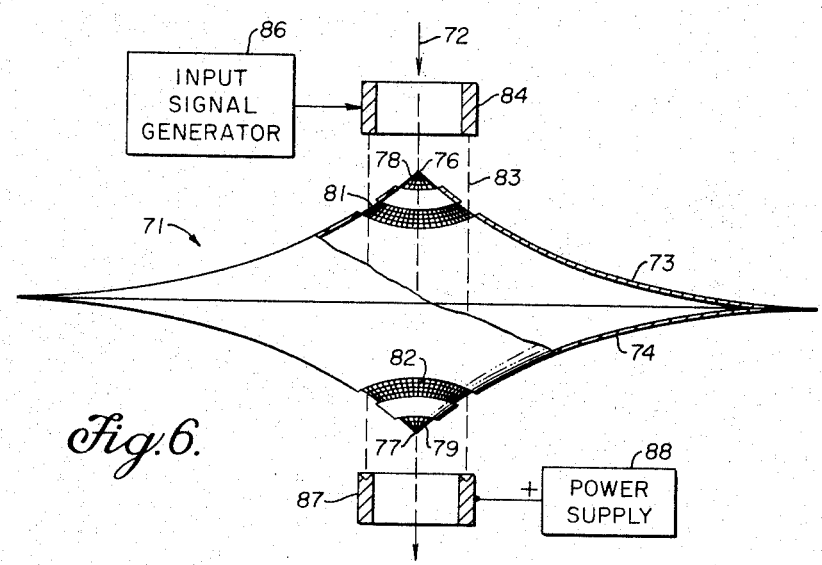

The invention will be best understood by reference to the following specification together with accompanying drawings of which:

FIGURE 1 is a longitudinal section view of a pair of coaxial conductors constituting a first embodiment of the invention, FIGURE 2 is a cross-section view taken at line 2—2 in FIGURE 1, FIGURE 3 is a plan view of stripline embodiment of the invention, FIGURE 4 is a section view taken at line 4—4 in FIGURE 3, FIGURE 5 is a closed cavity for extracting energy from a modulated electron beam and constituting a third embodiment of the invention, and FIGURE 6 is a closed cavity resonator for accelerating or bunching a proton beam in a synchrotron.

The present invention can be constructed with various physical configurations, all of which are essentially similar from the electrical standpoint.

Referring now to FIGURES 1 and 2 in conjunction, there is shown a coaxial resonator 11 having an outer cylindrical conductor 12 and a coaxial inner conductor 13. The diameter of the inner conductor 13 increases along the length thereof from zero at a first end 14 of the cavity 11 until the inner conductor contacts the inside surface of the outer conductor 12 at the opposite end. The space 16 between the inner and outer conductors 13 and 12 is the active region in which high frequency electric and magnetic fields may be created by exciting the cavity 11 using signal input means as discussed later.

The configuration of region 16 is particularly designed to resonate at a fundamental frequency and at all harmonics of such fundamental frequency, thus allowing the creation of electromagnetic fields of any desired waveshape in cavity 11, according to the Fourier series. To achieve this result the shape of the inner conductor 13 is selected to have a characteristic impedance which varies inversely as the square of the axial distance from the open end 14, it being understood in the technology of resonators that such a relationship cannot be extended to the limits. Therefore, the ratio of D, the inside diameter of outer conductor 12, to d, the outside diameter of inner conductor 13, varies continuously with axial distance from open end 14. The actual spacing between the outer conductor 12 and the inner conductor 13 is calculated for many cross sections through the cavity 11. Methods for determining the dimensions of a resonator to obtain a specified impedance are discussed, for instance, in the text "Reference Data for Radio Engineers," 4th edition, page 591, published in 1956 by International Telephone and Telegraph Corporation. The dimensions so calculated are used to provide the desired curvature for the inner conductor 13.

It is found that with a resonator so constructed, the phase velocity of the lowest fundamental mode is equal to one-half the velocity of electromagnetic propagation in the region 16 (usually the latter velocity equals the velocity of light).

The conductors of the resonator can alternately be flat transmission lines (striplines). Such a flat transmission line uses a pair of conducting surfaces for which the necessary variation in the characteristic impedance is provided by varying nin-linearly either the spacing between the conductors or by varying the width of the conductors, or a combination of both. FIGURES 3 and 4 show such an embodiment of the invention wherein the spacing between conductors changes linearly along the length of the resonator while the necessary characteristic impedance is obtained by varying the width of a conductor. A flat transmission line type of resonator 31 has a ground plane 32 which is a large flat sheet of conductive material such as copper. A conductive transmission line strip 33 has a first end 34 containing the ground plane sheet 32 as shown particularly in FIGURE 4. The remainder of the strip 33 is spaced from the ground plane 32, the space being increased linearly along the length of the strip to a maximum spacing at a tip 35. The width of the strip 33 is altered along its length from first end 34 to tip 35, providing a characteristic impedance which varies onversely with the square of distance from the tip 35 toward first end 34 along a line transverse to the first end 34. As shown particularly in FIGURE 3, to obtain the desired impedance the width of the strip 33 is varied from very narrow at the tip 35 to a maximum near the end 34, the end 34 having a width approximately half the maximum width.

In FIGURE 4 there is shown an input circuit which is a radio frequency signal source 36. Such input circuit 36 will ordinarily operate at the fundamental resonant frequency of the cavity 31, however, the output signal from the input circuit 36 can have any shape of waveform. An input coupling loop 37 is connected by a shielded transmission line to the input circuit 36, the loop passing through a small opening 38 in the ground plane 32 and being connected to the strip 33. An output signal is coupled to a utilization circuit 39 by electrical connections from the tip 35 to the ground plane 32. The tip 35 is the highest voltage point of the resonator 31, that is, the utilization circuit 39 receives the highest signal voltage possible from resonator 31 by being connected at tip 35. Any capacitive or inductive parameters of the utilization circuit are so related to strip 33 as to form an integral part of the resonator circuit.

In operation, the resonator 31 is excited by input signals from input circuit 36. The operation of resonator 31 is somewhat analogous to that of a transformer with low voltage, high current signals at input loop 37 being available at utilization circuit 39 as high voltage, low current signals. Conversely, a step-down transformation is obtainable if the input circuit 36 is connected at tip 35 while the utilization circuit 39 is connected to loop 37. The resonator 31 could also be used for energy storage, wherein a low power signal from the input circuit is applied to the resonator to build-up electromagnetic fields therein. The utilization circuit 39 is then suddenly connected to the tip 35 to rapidly discharge the energy in the cavity.

The resonator 31 can also be used as a function generator by making use of the differing ways the electromagnetic fields combine at different locations in the structure. The electromagnetic field for each harmonic frequency has a differing field configuration in the resonator 31. An output connection 40 between the conductors 32 and 33 provides an output signal which is the resultant of the various electromagnetic fields at the particular point at which the loop is located. If the connection 40 is moved to another location, the ratio and phase of the electromagnetic fields for the various frequencies change and thus output signals with differing waveshapes are obtainable by moving the output loops. It is necessary, of course, for the input signal to contain the various harmonic frequency signals which are to be combined in differing ratios and phases to produce the output signal.

An effect similar to that resulting from moving the output loop can be obtained by changing the position of the input loop. In either case, the waveshape of the input signal is not necessarily the same as the waveshape of the output signal and the resonator 31 may be utilized to generate signals with a waveform substantially differing from the waveform of the input signal. In other words, the signals comprising the Fourier series for the input signal are separated in the resonator 31 and thus are re-arrangeable in differing phases and ratios.

In the embodiment of the invention shown in FIGURES 3 and 4, the ground plane 32 provides, in effect, a mirror image of the strip 33. If the ground plane 32 is removed and an actual strip disposed at the position of the previous mirror imaged strip, operation of the cavity is unchanged except that the characteristic impedance values are doubled.

If, as previously described, the spacing between the strip conductors 32 and 33 is varied non-linearly to provide the desired characteristic impedance, it is possible to construct a stripline resonator with triangularly shaped strips. A cavity resonator as shown in FIGURE 5 represents still another embodiment of the invention and is, in effect, a plurality of the above described stripline resonator joined side by side to form an enclosed structure.

The cavity 51 of FIGURE 5 is actually formed by joining the edges of two cusp discs 52 and 53. The central portions of the two discs 52 and 53 are spaced apart, with the widest spacing at the centers 59 and 61 along the axis of the structure. The space 54 between the two discs 52 and 53 is the active region where electromagnetic fields are created, the highest potentials being developed between the centers 59 and 61 of the two discs, and with the voltage decreasing to zero at the edges. The centers 59 and 61 of the discs 52 and 53 may be compared with the tip 35 of the resonator of FIGURES 3 and 4. However, in the embodiment of FIGURE 5, the desired characteristic impedance is obtained by varying the curvature and thus the spacing between the disc conductors 52 and 53, rather than by varying the width of conductors. The characteristic impedance of the cavity 51 is thus caused to vary inversely with the square of the radius.

The cavity 51 shown in FIGURE 5 is utilized to extract energy from a pulsed electron beam 56. An electron gun 57 produces the pulsed beam of electrons 56, the electron beam being modulated as in a kylstron according to signals from an input signal generator 58. Such generator modulates the electron beam at the resonant frequencies of the cavity 51. The modulated electron beam 56 is directed along the axis of the cavity 51, the beam passing through the apexes 59 and 61 of the discs 52 and 53 wherein screened openings or grids 62 and 63 are provided for passage of the electron beam 56. The beam 56 is directed through the cavity 51 to a collector 64 which is at a positive potential provided by a power supply 66. Energy from the modulated electron beam causes electromagnetic fields to be created in the cavity 51. Such energy can be coupled to external circuitry by an output probe 67, which is constructed similarly to the input probe 37 of FIGURE 4. The electron beam thus traverses the cavity 51 at a region of highest electric field intensity while the probe 67 may be positioned, if desired, to intercept a relatively intense magnetic field. While the function of the invention as shown in FIGURE 5 is somewhat analogous to the function of the output cavity of a conventional klystron, the present invention is not limited to sinusoidal signals as is a klystron.

Considering now a typical usage of the invention, it may be desirable to generate a specific non-sinusoidal waveform in the beam accelerating cavity of a charged particle accelerating synchrotron. In FIGURE 6 there is shown such a cavity 71 for accelerating a pulsed beam of protons 72. The cavity 71 is constructed from first and second cusped discs 73 and 74 which have the same general shape as the discs 52 and 53 in the cavity 51 of FIGURE 5. The discs 73 and 74 each have an apex 76 and 77 respectively provided with a screened opening or grid 78 and 79 at the point to provide for the passage of the proton beam 72. In addition, annular grids 81 and 82 are provided in the discs 73 and 74 coaxially with apex grids 78 and 79 and in proximity thereto.

Electromagnetic fields are created in the cavity 71 by a hollow cylidnrical electron beam 83 formed coaxially around the proton beam 72, an annular electron gun 84 being disposed adjacent the apex 76 of disc 73. The electron beam 83 is modulated according to control signals from an input signal generator 86. The electron beam 83 enters the cavity 71 through annular grid 81, excites the cavity, and emerges through annular grid 82. An annular collector 87 is disposed adjacent the apex 72, the collector being provided with a relatively positive potential by a power supply 88.

In operation, the electron beam 83 excites the cavity 71, building up oscillating electromagnetic fields therein, the peak electric field being provided between the apexes 76 and 77. The proton beam 72 is acted upon by such electric field and accelerated accordingly. Much greater control over the proton beam is possible with the present invention than with conventional proton accelerating cavities since the electric field is not limited to a simple sinusoidal configuration.

As a variation, it is possible to use only one of the pair of discs used in the cavities of FIGURES 5 and 6. The open side of the disc would then be closed by a flat conductive ground plane to form a cavity.

Thus while the invention has been disclosed with respect to various exemplary embodiments, it will be apparent to those skilled in the art that numerous variations and modifications may be made within the spirit and scope of the invention and it is not intended to limit the invention except as defined in the following claims.

What is claimed is:

1. In an electrical resonator for supporting periodic non-sinusoidal waveforms, the combination comprising at least two conductive elements which are joined at a first region and spaced apart by a maximum gap at a second region, said elements being spaced apart by a gap which is progressively greater proceeding from said first region to said second region, the gap having a characteristic impedance varying inversely with the square of the distance from said second region, means exciting electromagnetic waves in said gap, and means for extracting energy from said gap.

2. An electrical resonator as described in claim 1 wherein the extent of said gap varies linearly between said first region and said second region, and wherein the surface of at least one conductor that faces said gap is of varying width whereby said characteristic impedance variation is determined in part by the varying width of said one conductor.

3. An electrical resonator as described in claim 1 wherein the width of the surface of at least one of said conductors which faces said gap varies linearly between said first region and said second region whereby said characteristic impedance variation is fixed in part by the variation in extent of said gap.

4. In an electrical resonator for supporting non-sinusoidal periodic waves, the combination comprising a pair of elements having facing conducting surfaces, at least one of said surfaces having a broad end and a narrower end, said elements being joined along said broad end and being divertgent towards said narrower end providing a characteristic impedance in the gap between said surfaces which varies inversely with the square of the distance from said narrow end, input means generating high frequency electromagnetic waves in the gap between said surfaces, and output means extracting energy from said electromagnetic waves in said gap.

5. In an electrical resonator for supporting non-sinusoidal periodic waves, the combination comprising a conductive cylinder having a first end and a second end, a central conductor having a first end and a second end and disposed coaxially within said cylinder, said first end of said central conductor contacting said first end of said cylinder, the diameter of said central conductor being reduced from maximum at said first end to zero at said second end, the diameter of said central conductor at all points between said first end and said second end providing a characteristic impedance between said cylinder and said central conductor which is inversely proportional to the square of the distance from said second end, means exciting an electromagnetic field between said cylinder and said central conductor, and means extracting energy from said electromagnetic field.

6. In a cavity resonator for supporting non-sinusoidal periodic electromagnetic waves, the combination comprising a pair of coaxial cuspate circular conductors which are juxtaposed and joined together around the periphery forming a cavity which is of maximum extent along the axis of the conductors and of diminishing extent radially outward from the axis providing a characteristic impedance at each such point within said cavity which is inversely proportional to the square of the distance from said axis, means exciting electromagnetic waves in said cavity, and means within said cavity extracting energy from said electromagnetic waves.

7. A cavity resonator as described in claim 6 wherein an opening is provided at the cuspate center of each of said conductors at said axis, said exciting means being a modulated electron beam directed through said center openings and along said axis.

8. A cavity resonator as described in claim 7 wherein said modulated electron beam is of hollow cylindrical configuration, and wherein said means extracting energy is a charged particle beam directed through said cavity within said electron beam in coaxial relationship therewith.

9. A cavity resonator, supporting non-sinusoidal oscillatory electromagnetic fields, for accelerating charged particles within a particle accelerator, comprising a circular cuspate conducting cavity enclosure having a maximum extent along the axis thereof and a progressively diminishing extent in a direction radially outward from said axis providing a characteristic impedance within the cavity which varies in inverse proportion to the square of the distance from said axis, said enclosure having openings providing a through passage along said axis for said charged particle beam, and means for exciting said cavity.

10. Each and every novel feature and combination of novel features present in or possessed by the mechanism and/or process herein disclosed.

References Cited

UNITED STATES PATENTS 2,962,620    11/1960    Harman _____ 333—34

OTHER REFERENCES

Lund, C. C.: "A Broadband Transition From Coaxial Line to Helix," RCA Review, March 1950, vol. 11, No. 1, pp. 133–142.

Scott, H. J.: "The Hyperbolic Transmission Line as a Matching Section," Proceedings of the I.R.E., vol. 41, No. 11, November 1953, pp. 1654–1657.

HERMAN KARL SAALBACH, *Primary Examiner.*

L. ALLAHUT, *Assistant Examiner.*